(12) United States Patent
Takahashi et al.

(10) Patent No.: US 10,293,195 B2
(45) Date of Patent: May 21, 2019

(54) SAFETY DEVICE FOR AIRCRAFT

(71) Applicant: Mitsubishi Aircraft Corporation, Aichi (JP)

(72) Inventors: Yuta Takahashi, Tokyo (JP); Shingo Kawano, Tokyo (JP); Tsutomu Kawamizu, Tokyo (JP); Atsushi Fujii, Tokyo (JP); Shimpei Todaka, Tokyo (JP); Ushio Komoda, Aichi (JP); Toshiyuki Umemoto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/041,318

(22) Filed: Feb. 11, 2016

(65) Prior Publication Data

US 2016/0271431 A1 Sep. 22, 2016

(30) Foreign Application Priority Data

Mar. 17, 2015 (JP) .................................. 2015-052790

(51) Int. Cl.
*A62C 4/02* (2006.01)
*B64D 37/32* (2006.01)
(Continued)

(52) U.S. Cl.
CPC ............... *A62C 4/02* (2013.01); *A62C 3/065* (2013.01); *A62C 3/08* (2013.01); *B64D 37/04* (2013.01);
(Continued)

(58) Field of Classification Search
CPC .. A62C 4/02; A62C 3/065; A62C 3/08; B64D 37/04; B64D 37/32
(Continued)

(56) References Cited

U.S. PATENT DOCUMENTS 3,199,812 A * 8/1965 Spoecker ............... B64D 37/32
244/135 R
7,210,536 B2 * 5/2007 Alhamad ................. A62C 3/06
122/17.1

(Continued)

FOREIGN PATENT DOCUMENTS

JP 2012-206662 A 10/2012
JP 2014-094662 A 5/2014

OTHER PUBLICATIONS

Japanese Office action for application No. 2015-052790 dated Feb. 26, 2019.

*Primary Examiner* — Darren W Gorman
*Assistant Examiner* — Qingzhang Zhou
(74) *Attorney, Agent, or Firm* — Pearne & Gordon LLP

(57) ABSTRACT

There is provided a safety device for aircraft, that prevents an explosion of a fuel tank storing aviation fuel, the safety device including: a flame arrester that is arranged near an end of a ventilation passage on an aircraft outer side, as a part of the ventilation passage allowing the inside of the fuel tank and an outside of the aircraft to communicate with each other, to prevent a flame propagation into the fuel tank from the outside of the aircraft through the ventilation passage; and a heat transfer reducing part that is arranged closer to the outside of the aircraft than the flame arrester to prevent heat transfer to the fuel in the fuel tank from the flame.

16 Claims, 5 Drawing Sheets

(51) Int. Cl.
  *B64D 37/04* (2006.01)
  *A62C 3/06* (2006.01)
  *A62C 3/08* (2006.01)
  *B64D 45/00* (2006.01)

(52) U.S. Cl.
  CPC ........ *B64D 37/32* (2013.01); *B64D 2045/009* (2013.01)

(58) Field of Classification Search
  USPC .......................................... 244/129.2; 169/45
  See application file for complete search history.

(56) References Cited

U.S. PATENT DOCUMENTS

| | | | |
|---|---|---|---|
| 2008/0271814 A1* | 11/2008 | Wilton | A62C 4/00 141/285 |
| 2010/0294519 A1* | 11/2010 | Beele | F16L 5/04 169/45 |
| 2011/0042515 A1* | 2/2011 | Schoke | A62C 2/065 244/129.2 |
| 2011/0056972 A1* | 3/2011 | Lynas | B64D 37/10 220/745 |
| 2011/0056973 A1 | 3/2011 | Lynas et al. | |
| 2012/0250209 A1 | 10/2012 | Umemoto et al. | |
| 2014/0182864 A1 | 7/2014 | de St. Jeor et al. | |
| 2016/0009408 A1 | 1/2016 | Fukuda | |

* cited by examiner

SAFETY DEVICE FOR AIRCRAFT

BACKGROUND OF THE INVENTION

Field of the Invention

The present invention relates to a safety device for aircraft that is used for explosion protection of a fuel tank.

Description of the Related Art

To achieve explosion protection of a main wing, serving as a fuel tank storing aviation fuel, the inside of the main wing is filled with nitrogen gas (Japanese Patent Laid-Open No. 2014-94662), or a lightning protection fastener provided with an insulating cap (Japanese Patent Laid-Open No. 2012-206662) is used in the main wing.

Inside a main wing, a ventilation passage that communicates with outside air is provided. Ventilation performed through the ventilation passage balances outside air pressure and pressure inside the main wing.

In the ventilation passage and around a vent hole facing the outside air, there is flammable gas that is a mixture of vaporized fuel steam and air. If the flammable gas is ignited at the time of a lightning strike or in the event of a fire in an airport, it is required to prevent a flame from entering the fuel tank through the ventilation passage.

In addition, if a flame is held in the vent hole, it is also required to prevent fuel in the fuel tank from being heated by heat transmitted from the flame through a skin of the main wing to be ignited in the fuel tank.

It is an object of the present invention to provide a safety device for aircraft, capable of reliably preventing an explosion of a fuel tank even if flammable gas is ignited.

SUMMARY OF THE INVENTION

The present invention is a safety device for preventing an explosion of a fuel tank storing aviation fuel, and includes a flame arrester that is arranged near an end of a ventilation passage on an aircraft outer side, as a part of the ventilation passage allowing the inside of the fuel tank and the outside of the aircraft to communicate with each other, to prevent a flame propagation into the fuel tank from the outside of the aircraft through the ventilation passage, and a heat transfer reducing part that is arranged closer to the outside of the aircraft than the flame arrester to prevent heat transfer to the fuel in the fuel tank from the flame.

According to the present invention, the flame arrester enables preventing a backfire that may occur through the ventilation passage when flammable gas is ignited.

In addition, even if a flame is held at a place closer to the outside of the aircraft than the flame arrester, the heat transfer reducing part reduces heat transfer from the flame to the fuel in the fuel tank to prevent the fuel in the fuel tank from being heated to an ignition point of the fuel to be ignited.

The heat transfer reducing part of the present invention can include a heat absorbing member that absorbs heat of the flame by phase transition. It is preferable that the heat absorbing member is arranged substantially throughout in a circumferential direction of the ventilation passage.

The heat transfer reducing part of the present invention also can include an inner peripheral part that constitutes a part of the ventilation passage throughout a section from the end of the ventilation passage to the flame arrester, and an outer peripheral part that surrounds the inner peripheral part throughout the section from the outside. A gap is formed between the inner peripheral part and the outer peripheral part to provide thermal insulation properties to reduce heat transfer between the inner peripheral part and the outer peripheral part.

It is preferable that the gap is a sealed space under pressure reduced with respect to atmospheric pressure.

An aircraft of the present invention has a feature of including the safety device described above.

It is preferable that a duct constituting the end of the ventilation passage, on the aircraft outer side, is provided in a surge tank positioned at a wingtip of a main wing of the aircraft.

According to the present invention, the heat transfer reducing part can reliably prevent explosion of the fuel tank even if flammable gas is ignited.

DETAILED DESCRIPTION OF THE PREFERRED EMBODIMENTS

With reference to the accompanying drawings, a safety device to be used to prevent an explosion of a fuel tank of an aircraft will be described below.

(First Embodiment)

Figure 1A:
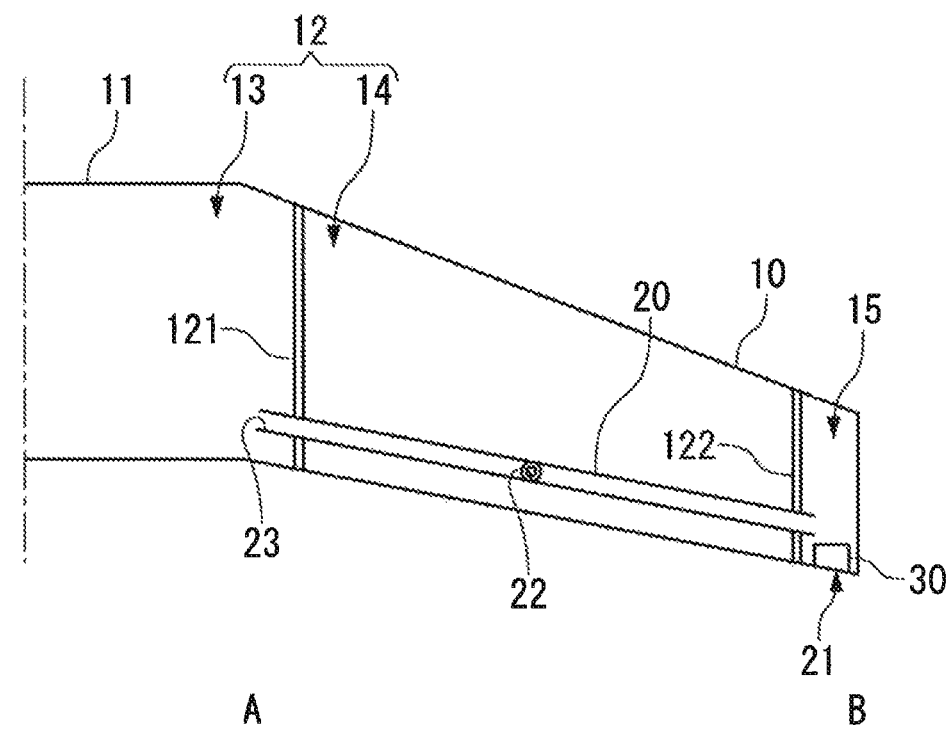
FIG. 1A shows the inside (a fuel tank) of a main wing of an aircraft of a first embodiment.

As shown in FIG. 1A, fuel (jet fuel) to be supplied to an engine of the aircraft is stored in a fuel tank 12 formed by a main wing 10 and a fuselage 11 (center wing).

Even if outside air pressure around the aircraft varies in accordance with a flight altitude, it is required to prevent excessive pressure from being applied to the fuel tank 12 due to differential pressure between the outside air pressure and internal pressure of the fuel tank 12. It is also required to take air into the fuel tank 12 for reduction in volume of fuel in the fuel tank 12 due to fuel consumed by the engine to continue supplying fuel.

Thus, a ventilation passage 20 is provided in the fuel tank 12 to allow the inside and outside of the fuel tank 12 to communicate with each other, thereby balancing the outside air pressure and the internal pressure.

(Structure of Tank in Main Wing)

The fuel tank 12 is divided into an inner tank 13 and an outer tank 14 by a partition wall 121.

Fuel stored in the inner tank 13 and the outer tank 14 is fed to an engine by a fuel pump (not shown). The fuel pump may be provided in each of the inner tank 13 and the outer tank 14. Alternatively, if a mechanism of feeding fuel between the tanks is provided, the fuel pump may be provided only in any one of the tanks.

The inner tank 13 is provided from the fuselage 11 to a base end side of each of the right and left main wings 10 (only one of them is shown).

The outer tank 14 is adjacent to the inner tank 13 across the partition wall 121, and extends to near a tip of the main wing 10. At the tip (wingtip) of the main wing 10, a surge tank 15 is provided.

The outer tank 14 and the surge tank 15 are provided in each of the right and left main wings 10.

The surge tank 15 is adjacent to the outer tank 14 across the partition wall 122.

The surge tank 15 receives fuel transiently fed into the ventilation passage 20 from the inner tank 13 or the outer tank 14 to prevent the fuel from leaking outside the aircraft. Usually, no fuel is stored in an internal space of the surge tank 15.

(Ventilation Passage)

The ventilation passage 20 extends from the inner tank 13 to the surge tank 15 via the outer tank 14 in the longitudinal direction of the main wing 10.

The ventilation passage 20 can be formed by using not only a normal pipe, but also stringers provided in back surface of a skin parallel along the longitudinal direction of the main wing 10. Specifically, a space positioned between stringers adjacent to each other is partitioned from a storage space in the fuel tank 12 to enable the ventilation passage 20 to be formed between the stringers.

The ventilation passage 20 includes a vent hole 22 that communicates with the inside of the outer tank 14, a vent hole 23 that communicates with the inside of inner tank 13, and a ventilation duct 21 that is provided in the surge tank 15 to communicate with outside air.

The ventilation passage 20 is provided in each of the right and left main wings 10 in a symmetric manner, and the inner tank 13 is provided with the vent hole 23 of the ventilation passage 20 on the left side, and the vent hole 23 of the ventilation passage 20 on the right side.

The ventilation passage 20 allows an internal space of each of the inner tank 13 and the outer tank 14 to communicate with outside air. Then, outside air flows into each of the tanks in accordance with differential pressure between outside air pressure and internal pressure of each of the tanks. Alternatively, gas in each of the tanks flows out to the outside of the aircraft to balance the outside air pressure and the internal pressure of each of the tanks.

Into the ventilation passage 20, flammable gas that is a mixture of fuel steam (such as hexane), which is vaporized fuel stored in the inner tank 13 and the outer tank 14, and air, flows.

Thus, if a lightning strike on an airframe causes large current to flow into the main wing 10 to be discharged at a place provided with a fastener, or the like, or if a flame or a spark reaches around the main wing 10 due to a building fire in an airport or a fire of another aircraft, the flammable gas existing near the ventilation duct 21 may be ignited by an ignition source, such as the spark, or the flame.

For that, the ventilation passage 20 includes a safety device 30 that prevents an explosion of the fuel tank 12 due to a flame F caused by an ignition of the flammable gas.

Figure 1B:
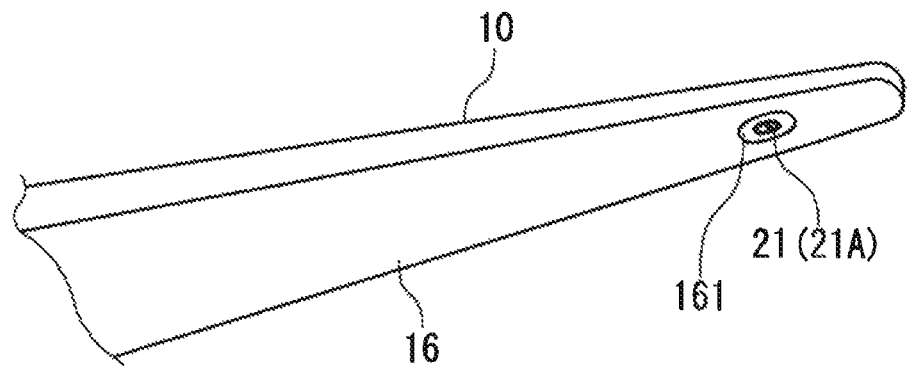
FIG. 1B shows an appearance (lower surface side) of the main wing of the first embodiment.
Figure 2:
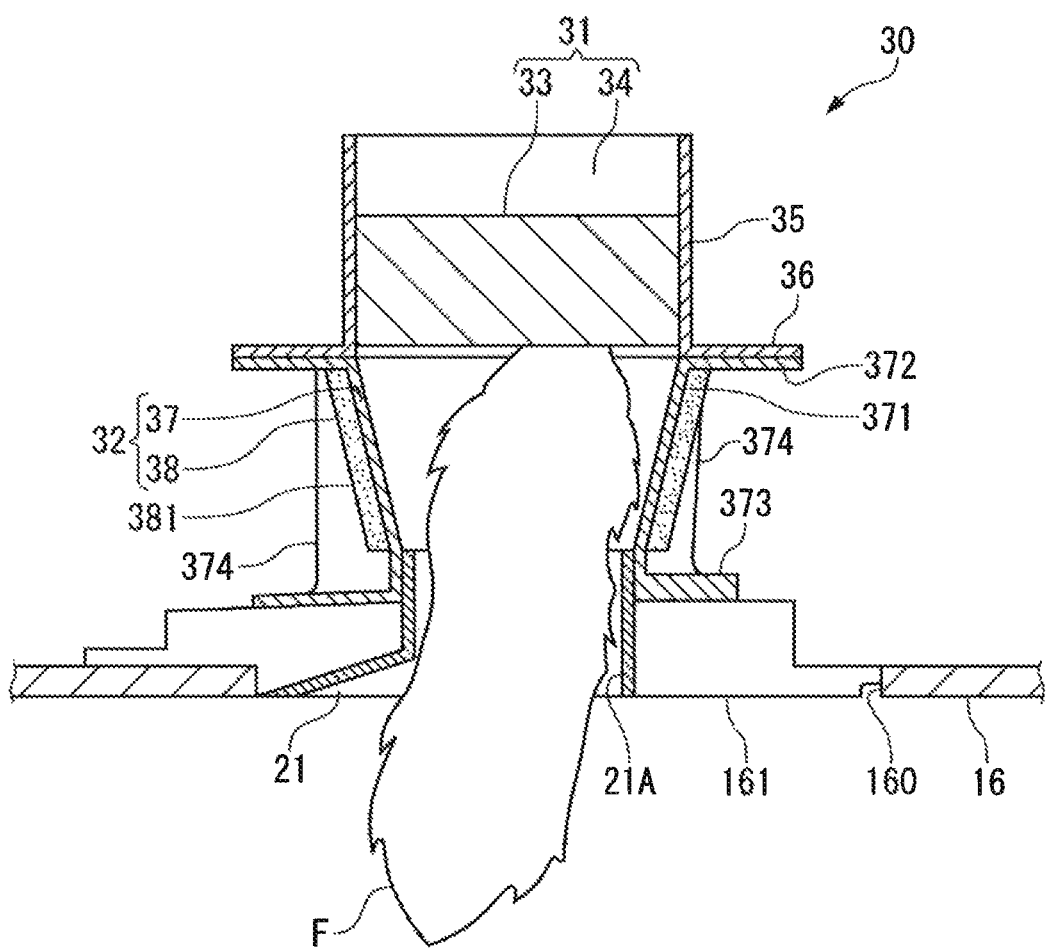
FIG. 2 is a longitudinal sectional view showing a safety device provided in the main wing.

As shown in FIGS. 1B and 2, the ventilation duct 21 constituting an end portion of the ventilation passage 20 is provided in a base member 161 assembled in a skin 16 of a lower side of the main wing 10.

The base member 161 is provided in a peripheral portion of the opening 160 formed in the skin 16.

The skin 16 and the base member 161 are formed of metal material, such as aluminum alloy, and stainless steel, or fiber-reinforced resin.

The ventilation duct 21 rises on a reverse side of the base member 161, and connected to a lower end of the safety device 30.

A vent hole 21A positioned at a lower end of the ventilation duct 21 penetrates the base member 161 to open to the outside of the aircraft, and faces to the outside air. The vent hole 21A corresponds to an end of the ventilation passage 20 on the aircraft outer side.

(Safety Device)

The safety device 30 includes a flame arrester 31 that prevents the flame F caused by ignition from propagating into the fuel tank 12, and a heat transfer reducing part 32 that reduces propagation of heat from the flame F to fuel in the fuel tank 12.

The flame arrester 31 is arranged near the vent hole 21A as a part of the ventilation passage 20.

The heat transfer reducing part 32 is arranged closer to the outside of the aircraft than the flame arrester 31.

Both of the flame arrester 31 and the heat transfer reducing part 32 are assembled in the ventilation passage 20.

(Flame Arrester)

The flame arrester 31 includes a preventing part body 33 that prevents the flame F from blasting into the fuel tank 12, and a case 34 that surrounds an outer periphery of the preventing part body 33.

The preventing part body 33 is provided with a gap that provides a specific upper limit value to flammable gas forming the flame F, and the preventing part body 33 absorbs heat of the flame F trying to pass through the gap. Accordingly, energy of the flame F is reduced to prevent the flame F from propagating ahead the preventing part body 33.

In accordance with estimated temperature and pressure of the flammable gas, an appropriate gap size and appropriate heat capacity are set to the preventing part body 33.

The preventing part body 33 allows going in and out of gas through the gap.

As the preventing part body 33, a variety of types known as a quenching element that prevents an instantaneous blast (backfire) of the flame F, such as a crimp ribbon type, a mesh type formed by stacking wire meshes, a parallel plate type, and a perforated plate type, are available. Any of the types are formed of refractory metal. The preventing part body 33 also can be formed by sintering metal particles.

The crimp ribbon type is formed by arranging a metal ribbon provided with a fine crimp (a fold) and a flat ribbon, which are stacked with each other, in a concentric circle shape, and includes a large number of gaps in a triangular shape in cross section, which are densely arranged. The crimp ribbon type has advantages such as: a relatively low pressure loss of gas; a high performance of preventing a blast of flame F; and sufficient strength for resisting an impact of flame pressure.

The case 34 includes a cylindrical portion 35 with which the outer periphery of the preventing part body 33 is covered, and a flange 36 positioned at a lower end of the cylindrical portion 35. The cylindrical portion 35 and the flange 36 are integrally formed of refractory metal.

An upper end of the cylindrical portion 35 is connected to a body of the ventilation passage 20 through the internal space of the surge tank 15.

(Heat Transfer Reducing Part)

The flame F may disappear by allowing because the flame arrester 31 absorbs heat of the flame F, or may be held (holding the flame) below the flame arrester 31 (on an outside air side) because the flammable gas is supplied through the ventilation passage 20 to achieve a condition of holding the flame.

If heat of the flame F is conducted through the skin 16 to increase temperature of fuel in the fuel tank 12, a necessary time to allow passengers and crews in the aircraft to escape outside the aircraft has to be secured before the temperature reaches an ignition point. The necessary time for escape is a few tens seconds to a few minutes, for example. To secure the time, the heat transfer reducing part 32 reduces heat transfer from the flame F to fuel in the fuel tank 12.

The heat transfer reducing part 32 includes a support member 37 that is provided closer to the outside of the aircraft than the flame arrester 31 to support the flame arrester 31, and a heat absorbing member 38 provided in the support member 37.

The support member 37 constitutes a part of the ventilation passage 20.

The support member 37 includes a cylindrical portion 371, an upper flange 372 positioned at an upper end of the cylindrical portion 371, a lower flange 373 positioned at a lower end of the cylindrical portion 371, and a rib 374 that connects the upper flange 372 and the lower flange 373 to each other.

The support member 37 can be formed of metallic material, such as aluminum alloy, for example.

The upper flange 372 is brought into contact with the flange 36 of the flame arrester 31 to be fixed.

The lower flange 373 is fixed to the reverse side of the base member 161.

An upper end of the ventilation duct 21 is inserted into the cylindrical portion 371. The cylindrical portion 371 of the present embodiment increases in diameter upward.

The heat absorbing member 38 is provided in an outer peripheral portion of the cylindrical portion 371. It is preferable that the heat absorbing member 38 is provided substantially throughout in a circumferential direction of the cylindrical portion 371 while avoiding the rib 374.

The heat absorbing member 38 is a solid phase at normal temperature, and transitions to a liquid phase when heated by the flame F to be melted.

The heat absorbing member 38 absorbs heat of the flame F applied to the heat absorbing member 38 on the basis of latent heat when melted. Heat transfer from the flame F to the fuel tank 12 is reduced by heat absorption of the heat absorbing member 38.

The heat absorbing member 38 may be provided in an inner peripheral part of the cylindrical portion 371.

To sufficiently achieve a purpose to reduce heat transfer from the flame F to the fuel tank 12 by using the heat absorbing member 38, the heat absorbing member 38 may be formed of an appropriate material that has a melting point within a temperature range of the flame F, and a large amount of heat (the amount of heat absorption) per unit mass required for melting the member. For example, erythritol ($C_4H_{10}O_4$) can be shown by example. In addition, a publicly known material used as a heat storage material is available for the heat absorbing member 38.

The heat absorbing member 38 may be formed by molding such kind of material, or may be a bag 381 that is filled with an object using such kind of material in variable shape or unstable shape. The present embodiment uses the bag 381 filled with the heat absorbing member 38 in a sheet shape.

The heat absorbing member 38 also can be formed of a refractory material (such as foam concrete), and water which is included in the refractory material. Even in that case, heat of the flame F can be absorbed on the basis of latent heat that occurs when water heated by the flame F is vaporized.

Thickness of the heat absorbing member 38 can be determined in consideration of a necessary time for escape to the outside of the aircraft. To extend time available for escape to the outside of the aircraft by delaying temperature rise of fuel in the fuel tank 12, it is preferable to increase the thickness of the heat absorbing member 38 to increase the amount of heat to be absorbed by the heat absorbing member 38.

(Operation Effect of the Present Embodiment)

According to the safety device 30 of the present embodiment described above, the flame arrester 31 enables preventing a backfire that may occur through the ventilation passage 20 when flammable gas existing inside the ventilation passage 20 or around it is ignited.

The flame arrester 31 prevents stored fuel from burning due to a blast of a flame caused by the backfire to enable preventing internal pressure of the fuel tank 12 from rapidly increasing to cause an explosion of the fuel tank 12.

Then, even if the flame F is not extinguished to be held at a place closer to the outside of the aircraft than the flame arrester 31, the flame arrester 31 continuously prevents the flame from propagating into the fuel tank 12.

In addition, it is necessary to prevent heat of the flame F from propagating to cause fuel to be ignited.

The ventilation duct 21 and the support member 37, in which the flame F is held, are provided in the base member 161 assembled in the skin 16 of the surge tank 15 that stores no fuel, and thus only conducting of heat of the flame F to the base member 161 and its periphery through the ventilation duct 21 and the support member 37 does not increase temperature of the fuel.

However, if the flame F is continuously held, heat of the flame F is conducted to an area above the skin 16 corresponding to the outer tank 14 and the inner tank 13, in which the fuel is stored, and then the skin 16 is heated to increase temperature of the fuel.

Thus, the present embodiment allows the heat absorbing member 38 of the heat transfer reducing part 32 to be heated by the flame F to absorb heat of the flame F. The heat of the flame F is used to melt the heat absorbing member 38 in the solid phase to the liquid phase (heat absorbing action). That is, temperature of the heat absorbing member 38 does not increase while the heat absorbing member 38 is melted.

The heat of the flame F is absorbed by the amount of heat used to melt the heat absorbing member 38, and thus heat transfer of the heat of the flame F to the fuel in the tanks 13 and 14 through the skin 16 is reduced.

Accordingly, even if the flame F is continuously held, temperature of the fuel in the outer tank 14 and the inner tank 13 is maintained at a temperature lower than an ignition point of the fuel at least until a necessary time to allow passengers and crews in the aircraft to escape outside the aircraft elapses.

As above, the safety device 30 of the present embodiment reliably prevents an explosion of the fuel tank 12 by prevention of propagating of the flame F and absorbing of the heat of the flame F even if the flammable gas is ignited.

The heat absorbing member 38 of the present embodiment still stays in the bag 381 even if becoming the liquid phase by heated by the flame F. After that, the heat absorbing member 38 cools to return to the solid phase, and then can be reused.

The heat absorbing member 38 can be arranged at an appropriate place to which heat of the flame F held at a place closer to the outside of the aircraft than the flame arrester 31 is sufficiently applied.

Figure 3:
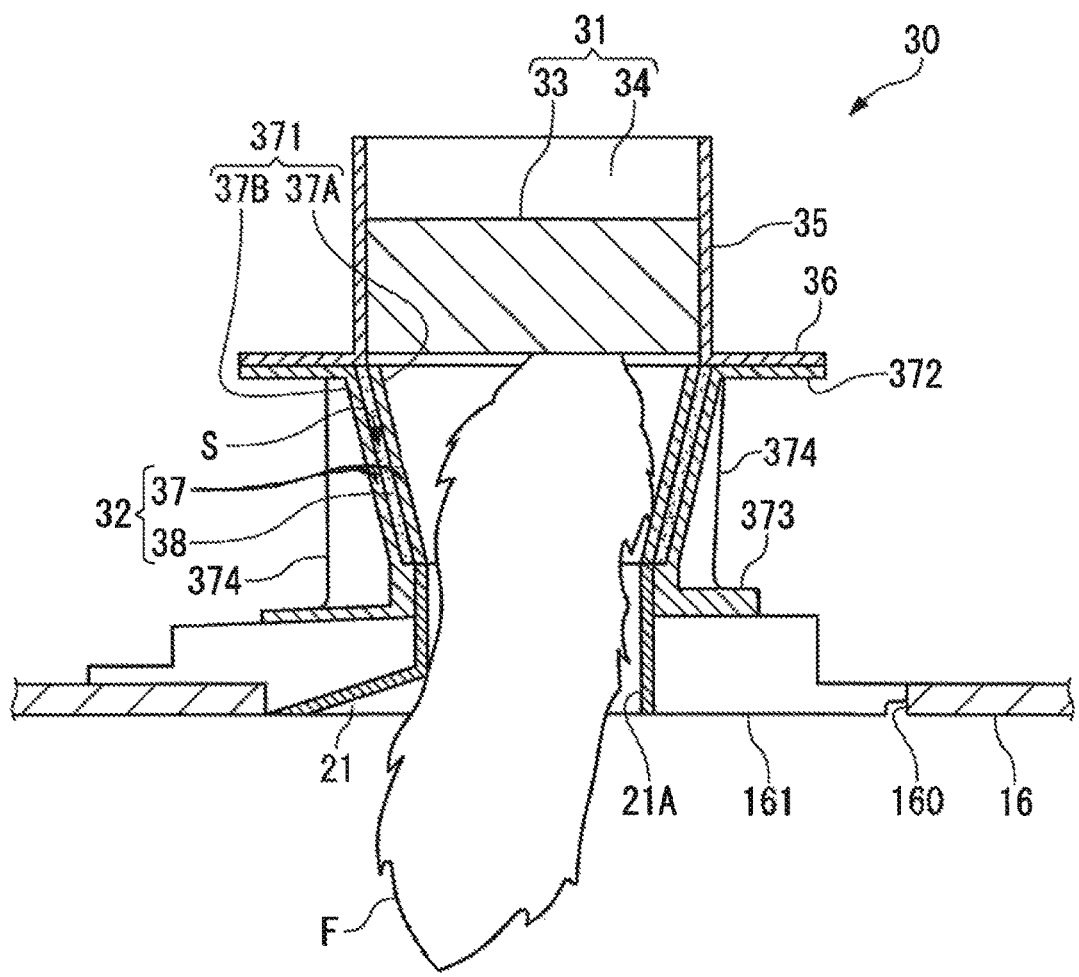
FIG. 3 is a longitudinal sectional view showing a safety device in accordance with a variation of the first embodiment.

In an example shown in FIG. 3, the cylindrical portion 371 of the support member 37 has a double pipe structure composed of an inner peripheral part 37A and an outer peripheral part 37B, and the heat absorbing member 38 is arranged in a gap S formed all around between the inner peripheral part 37A and the outer peripheral part 37B.

The gap S is closed at a lower end of each of the inner peripheral part 37A and the outer peripheral part 37B. The gap S may be closed at an upper end thereof.

Even in the example shown in FIG. 3, the heat absorbing member 38 melted to become the liquid phase still stays in the gap S, and thus the heat absorbing member 38 returning to the solid phase can be reused.

Figure 4:
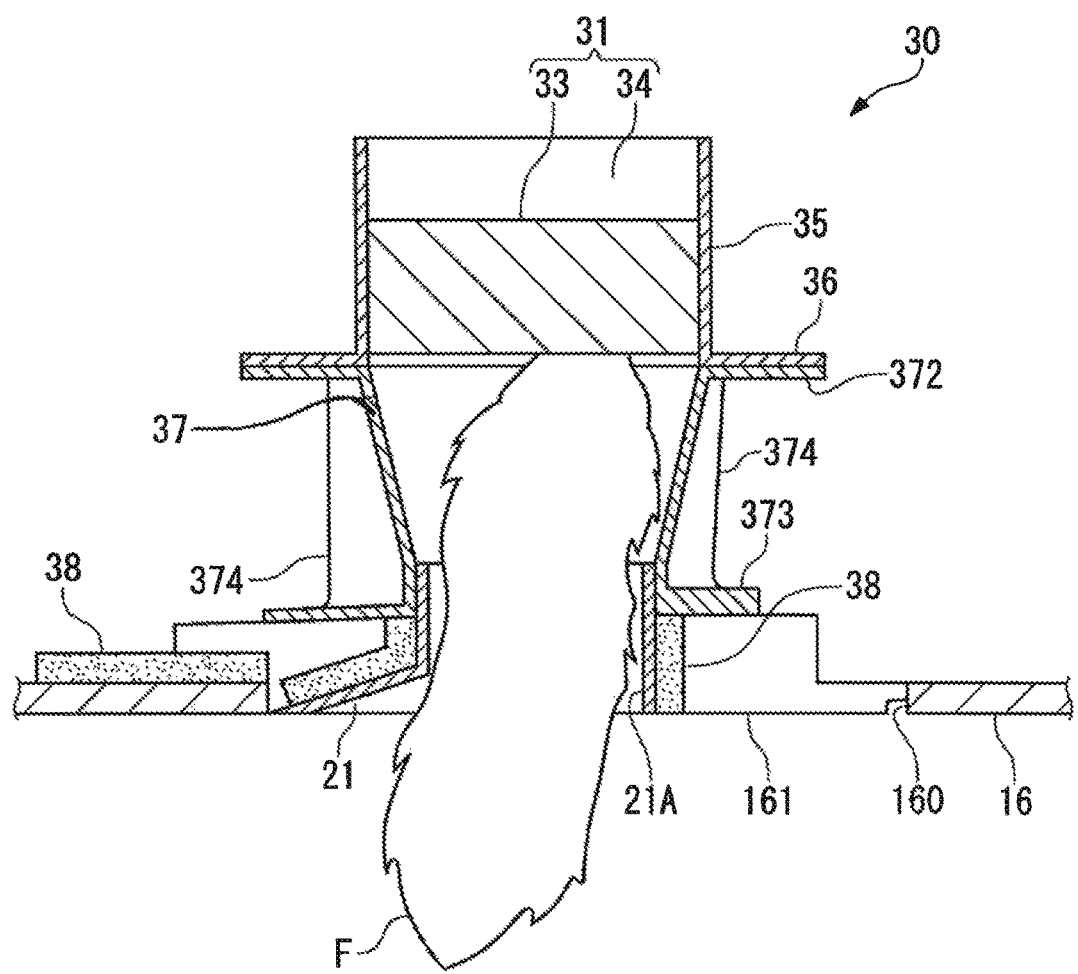
FIG. 4 is a longitudinal sectional view showing a safety device in accordance with another variation of the first embodiment.

As shown in FIG. 4, the heat absorbing member 38 also can be provided in the ventilation duct 21 and the base member 161.

This example shows that the support member 37 is not always needed to support the heat absorbing member 38, and the heat absorbing member 38 can be provided in an appropriate member positioned closer to the outside of the aircraft than the flame arrester 31.

Providing the heat absorbing member 38 in one or more members selected among the support member 37, the ventilation duct 21, and the base member 161, enables heat transfer from the flame F to the fuel in the fuel tank 12 to be reduced. Thereby, a necessary time for escape to the outside of the aircraft can be secured.

(Second Embodiment)

Figure 5:
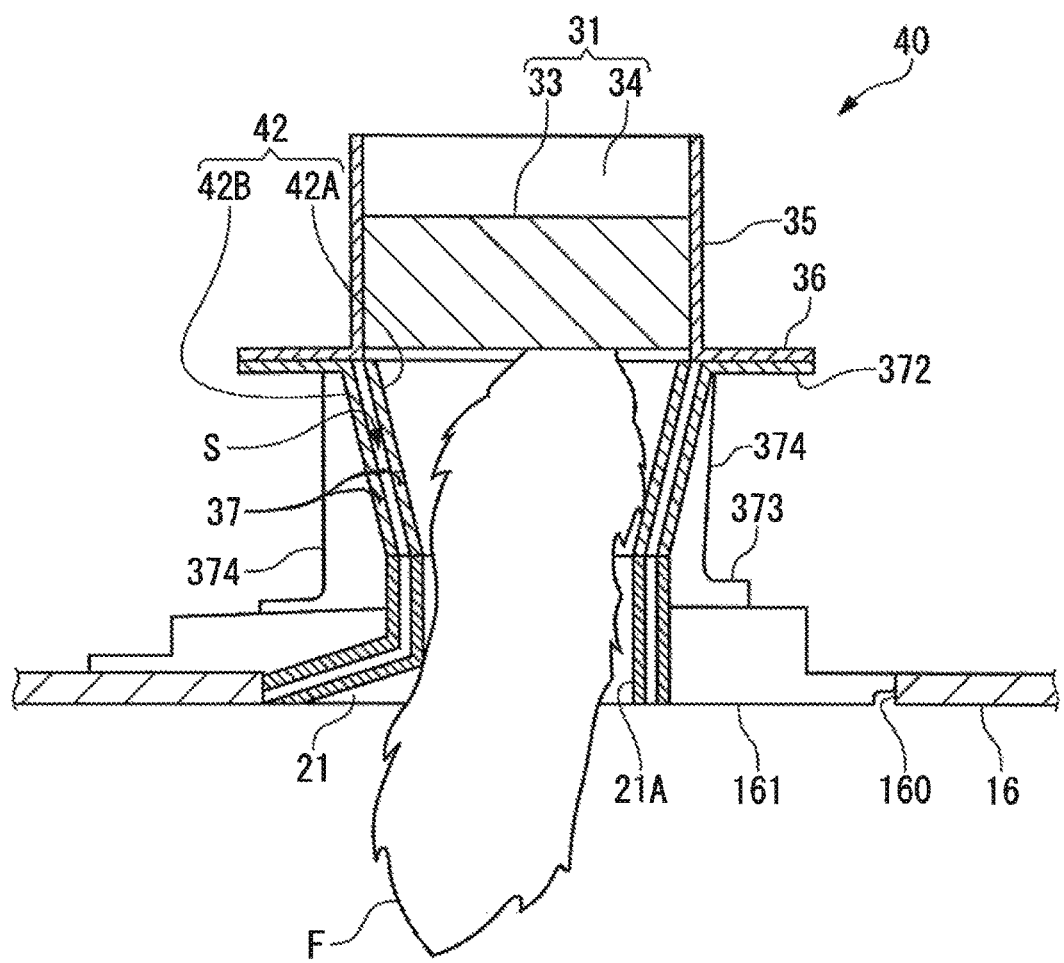
FIG. 5 is a longitudinal sectional view showing a safety device in accordance with a second embodiment.

Next, with reference to FIG. 5, a second embodiment of the present invention will be described.

In the second embodiment, a matter different from that of the first embodiment will be mainly described. The same configuration as that of the first embodiment is designated by the same reference numeral.

A safety device 40 in accordance with the second embodiment includes the flame arrester 31, and a heat transfer reducing part 42.

As with the heat transfer reducing part 32 of the first embodiment, the heat transfer reducing part 42 of the second embodiment reduces propagation of heat from the flame F to the fuel in the fuel tank 12 even if the flame F is held at a place closer to the outside of the aircraft than the flame arrester 31.

For that, the heat transfer reducing part 42 includes a double pipe structure composed of an inner peripheral part 42A that supports the flame arrester 31, and an outer peripheral part 42B that surrounds the inner peripheral part 42A from the outside.

The inner peripheral part 42A constitutes a part of the ventilation passage 20.

The inner peripheral part 42A and the outer peripheral part 42B are provided in the support member 37 and the ventilation duct 21, which constitute the ventilation passage 20 throughout a section from the vent hole 21A that is an end of the ventilation passage 20 to the flame arrester 31.

The gap S including air, between the inner peripheral part 42A and the outer peripheral part 42B, is formed to provide thermal insulation properties to the heat transfer reducing part 42. The gap S is formed all around between the inner peripheral part 42A and the outer peripheral part 42B.

In the present embodiment, the gap S is formed as a sealed space in which pressure is reduced to a predetermined vacuum degree with respect to the atmosphere to increase the thermal insulation properties of the heat transfer reducing part 42.

It is preferable that the support member 37 including the inner peripheral part 42A and outer peripheral part 42B is formed of metallic material with a sufficiently high heat resistance (such as stainless steel).

Even if the flame F held in the ventilation duct 21 and the support member 37 directly heats the inner peripheral part 42A of the heat transfer reducing part 42, thermal insulating action based on low thermal conductivity of air in the gap S reduces heat transfer from the flame F to the skin 16 exceeding the inner peripheral part 42A.

Accordingly, temperature of the fuel in the outer tank 14 and the inner tank 13 is maintained at a temperature lower than an ignition point of the fuel at least until a necessary time for escape to the outside of the aircraft elapses to enable preventing explosion of the fuel tank 12 due to ignition of the fuel.

Besides reducing pressure in the gap S to a predetermined vacuum degree, preventing convection of gas in the gap S in a case where the gap S has a relatively large size by filling the gap S with gas with thermal conductivity lower than that of air, such as carbon dioxide and hydrocarbon, or by arranging a heat insulator, such as glass wool, and urethane foam, in the gap S, is also effective to increase thermal insulation properties.

To reduce propagation of radiant heat of the flame F in the ventilation duct 21, for example, providing a heat reflecting member (such as copper foil) that reflects radiant heat of the flame F inward, in the inner peripheral part 42A or the gap S, or applying mirror-like finishing that functions as with the heat reflecting member to the inner peripheral part 42A, is also effective.

In addition, structures of the first and second embodiments described above can be combined. For example, if the heat transfer reducing part 42 of the second embodiment includes the heat absorbing member 38 (refer to FIG. 4) to be provided in the ventilation duct 21 and the base member 161, heat transfer from the flame F to the fuel in the fuel tank 12 can be further reduced on the basis of thermal insulating action and heat absorbing action.

Other than the above, it is possible to select from the structures shown in the embodiments above, and to appropriately modify them into another structure, within a range without departing from the essence of the present invention.

The safety device of the present invention also can be provided near a vent hole facing horizontally or upward.

In addition, a pipe, a duct, and the like, of the ventilation passage of the present invention, can be arbitrarily formed. In each of the embodiments described above, the case 34, the support member 37, and the ventilation duct 21, of the flame arrester 31, are separately formed, in consideration of productivity and ease of assembly. However, these components can be integrally formed.

The safety device of the present invention also can be used in combination with an explosion protection system that supplies nitrogen-enriched gas into the fuel tank, and an explosion protection structure using a lightning protection fastener.

The safety device of the present invention can be used for not only explosion protection of a fuel tank of an aircraft but also explosion protection of fuel tanks of various kinds of plant and equipment.

What is claimed is:

1. A safety device for an aircraft that prevents an explosion of a fuel tank storing an aviation fuel, the safety device comprising:
a flame arrester provided within an inside of the aircraft and arranged near an end of a ventilation passage on an outer side of the aircraft, as a part of the ventilation passage allowing an inside of the fuel tank and an outside of the aircraft to communicate with each other, to prevent a flame propagation into the fuel tank from the outside of the aircraft through the ventilation passage, the outer side of the aircraft separating the inside and the outside of the aircraft; and a heat transfer reducing part provided within the inside of the aircraft and positioned on an outer peripheral part of the ventilation passage to prevent heat transfer to the fuel in the fuel tank from the flame, wherein the heat transfer reducing part is positioned a first distance from the outside of the aircraft, the flame arrester is positioned a second distance from the outside of the aircraft, and wherein the first distance is smaller than the second distance.

2. The safety device for aircraft according to claim 1, wherein the heat transfer reducing part includes a heat absorbing member that absorbs heat of the flame by phase transition.

3. The safety device for aircraft according to claim 2, wherein the heat absorbing member is arranged substantially throughout in a circumferential direction of the ventilation passage.

4. The safety device for aircraft according to claim 1, wherein the heat transfer reducing part includes an inner peripheral part that constitutes a part of the ventilation passage throughout a section from the end of the ventilation passage to the flame arrester, and an outer peripheral part that surrounds the inner peripheral part throughout the section from an outside, and wherein a gap is formed between the inner peripheral part and the outer peripheral part to provide thermal insulation properties to reduce heat transfer between the inner peripheral part and the outer peripheral part.

5. The safety device for aircraft according to claim 4, wherein the gap is a sealed space under pressure reduced with respect to atmospheric pressure.

6. The safety device for aircraft according to claim 1, wherein the flame arrester includes a quenching element as a preventing part body.

7. The safety device for aircraft according to claim 1, wherein the flame arrester includes a preventing part body formed of a refractory metal.

8. The safety device for aircraft according to claim 6, wherein the flame arrester further includes a case that surrounds an outer periphery of the preventing part body.

9. The safety device for aircraft according to claim 7, wherein the flame arrester further includes a case that surrounds an outer periphery of the preventing part body.

10. The safety device for aircraft according to claim 6, wherein the quenching element is a crimp ribbon type.

11. The safety device for aircraft according to claim 1, wherein the safety device is provided in a surge tank positioned at a wingtip of a main wing of the aircraft.

12. The safety device for aircraft according to claim 11, wherein
the flame arrester includes a quenching element as a preventing part body, and a case that surrounds an outer periphery of the quenching element,
a first end of the case is connected to a body of the ventilation passage through an internal space of the surge tank,
a second end of the case is directly connected to an end of the heat transfer reducing part in the surge tank.

13. The safety device for aircraft according to claim 12, wherein the body of the ventilation passage is a pipe that extends in a longitudinal direction of a main wing of the aircraft.

14. An aircraft comprising the safety device according to claim 1.

15. The aircraft according to claim 14, wherein the safety device is provided in a main wing of the aircraft.

16. The aircraft according to claim 14, wherein a duct constituting the end of the ventilation passage is provided in a surge tank positioned at a wingtip of a main wing of the aircraft.

* * * * *